2,653,061

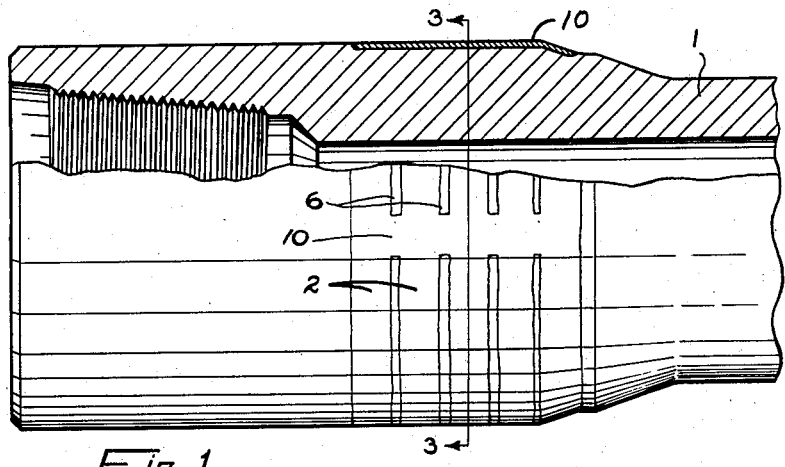
Fig. 1
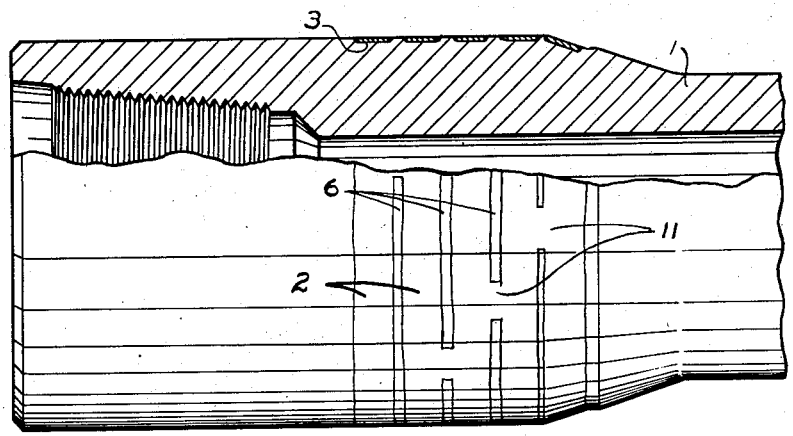
Fig. 2
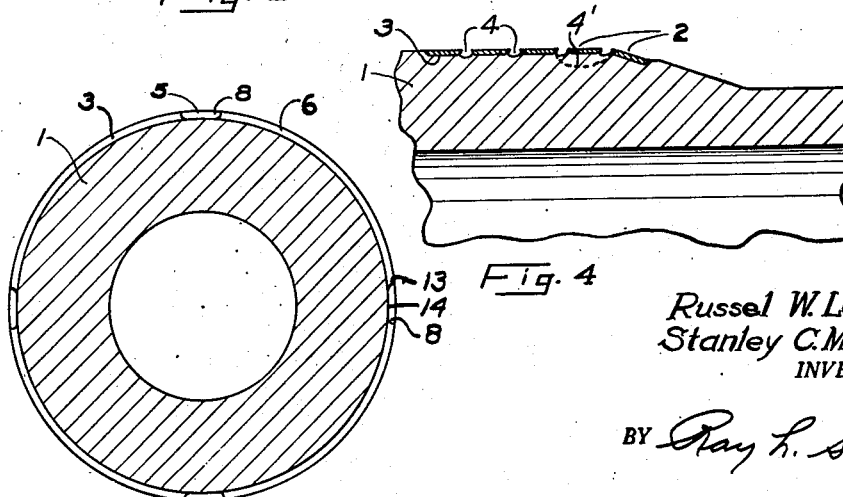
Fig. 3
Fig. 4
Russel W. Lewis
Stanley C. Moore
INVENTORS
BY *Ray L. Smith*
ATTORNEY Patented Sept. 22, 1953

UNITED STATES PATENT OFFICE 2,653,061

WEAR RESISTANT TOOL JOINT

Russel W. Lewis, Lafayette, La., and Stanley C. Moore, Houston, Tex., assignors to Hughes Tool Company, Houston, Tex., a corporation of Delaware Application July 15, 1948, Serial No. 38,826

3 Claims. (Cl. 308—4)

This invention relates to tool joints employed to interconnect successive sections of drill pipe and to drill collars used at the lower end of a drill string when drilling earth bores by the rotary method of drilling. More specifically the invention relates to the provision of a wear resistant surface on such members.

The invention constitutes an improvement over that disclosed in Neuhaus Patent No. 2,334,350, issued November 16, 1943.

Through the use of the invention of the patent to which reference has just been made, a greatly enhanced life of a tool joint or drill collar is had. It has been found, however, that undercutting of the lands between adjacent bands of hard facing material takes place and that such undercutting is followed by a breaking away of the hard facing material with the result that rapid deterioration of the hard facing takes place followed by the rapid wearing away of the underlying and adjacent metal which the hard facing material is designed to protect. The present invention has evolved from the difficulties experienced, and just enumerated, and it is an object of the invention to provide an improved hard facing for tool joints and drill collars to overcome these difficulties.

Another object is to provide hard facing for tool joints and drill collars in a manner that undercutting of the lands between adjacent bands of hard facing material will be avoided and that the life of the drill collar or tool joint will thereby be prolonged.

Still another and more specific object of the invention is to provide a wear resistant facing upon a surface subjected to abrasion, such facing comprising spaced bands of hard facing material, and such bands being interconnected by ribs of hard facing material transecting the lands between successive bands.

Other and further objects of the invention will be more fully apparent from the following descrition considered in connection with the accompanying drawings in which:

Fig. 1 is a side view partly in section showing a tool joint embodying the invention;

Fig. 2 is a view similar to that shown in Fig. 1 but showing an alternate arrangement of the deposits of wear resistant material transecting the lands between adjacent circumferential bands of such material;

Fig. 3 is a sectional view taken on the line 3—3 of Fig. 1 but with the hard facing material omitted to show the arrangement of grooves for receiving such material;

Fig. 4 is a fragmentary view of a tool joint showing the nature of undercutting heretofore experienced and which is avoided in accordance with the invention.

It is to be understood that while the invention is illustrated and described as applied to a tool joint, the invention is equally applicable to use on drill collars as hereinafter indicated.

When using the invention disclosed in the Neuhaus Patent No. 2,334,350, to which reference has already been made undercutting takes place as shown in Fig. 4 of the drawings where the wall of the body of the hard faced member is shown at 1 to which there was previously applied bands 2 of hard facing material in circumferential grooves 3 provided therefor. Such hard facing material is intimately bonded to the bottom and side wall of the grooves.

When the tool joint or drill collar is subjected to normal use the material in the lands between bands 2 of hard facing material tends to wear away more rapidly than such material with the result that undercutting, as shown at 4, takes place.

Inasmuch as the hard facing material is relatively brittle, progressive breaking away of the material follows and, in turn, a wide deep undercut band develops and requires repair or discarding of the member if failure is to be avoided. The breaking away of the material of a band and subsequent undercutting will assume proportions indicated by the dotted line 4' and in advanced stages additional bands and underlying metal will be disintegrated.

It has been found that the difficulties indicated can be avoided by providing, in addition to the circumferential grooves 3, one or more grooves 5 (Fig. 3) which extend longitudinally of the member and which therefore transect each of the lands 6 between adjacent bands 2 of the hard facing material.

As illustrated in Fig. 3, these transecting grooves may be four in number. Such number is given by way of illustration only, it having been found that the use of a single transecting groove, especially on drill collars, will substantially eliminate undercutting.

The grooves 5 and 6 are preferably of equal and uniform depth, $\tfrac{3}{32}$" in depth having been found satisfactory. In order to assure desirable interfusion of hard facing material with the bottom and side walls of the grooves, the juncture of the bottom 12 and side wall 13 is preferably formed on a small radius, as shown at 8.

The hard facing material may comprise any of the various materials heretofore developed for this purpose, the preferred material comprising one of the stable carbides such as tungsten carbide particles, deposited in the grooves with a matrix metal interfused with the bottom and side walls of the grooves.

As shown at 10, in Fig. 1, the land transecting grooves, and hard facing material deposited therein, may extend linearly along the surface to be protected. Such arrangement facilitates formation of the transecting grooves 5. Alternately such grooves and hard facing material may be staggered as shown at 11 in Fig. 2.

By providing grooves which transect lands in the manner described and depositing a hard facing material in such grooves, also as described, it has been found that the service of tool joints and drill collars protected in this manner are materially extended.

Broadly the invention comprehends the provision of an improved wear resistant surface by preventing undercutting and resultant deterioration in a surface protected by spaced bands of wear resistant material applied to such surface.

What is claimed is:

1. A wear resistant surface for tool joint members and the like comprising, circumferential grooves in the surface of the member, at least one axially extending groove transecting the lands between adjacent circumferential grooves, successive portions of said last mentioned groove being staggered peripherally about the member, and a quantity of wear resistant metal fused into each of said grooves and integrally engaging the bottom and side walls thereof.

2. A wear resistant surface for tool joint members and the like comprising, circumferential grooves in the surface of the member, a plurality of grooves extending axially of the member and transecting the lands between successive circumferential grooves, successive portions of said last mentioned grooves being staggered peripherally about the member, and a quantity of wear resistant metal fused into each of said grooves and integrally engaging the bottom and side walls thereof.

3. A wear resistant surface for a tubular member comprising spaced peripheral bands of wear resistant material integrally bonded to the surfaces of circumferential grooves in the member, and additional quantities of the wear resistant material bonded to the surfaces of grooves in the member transecting the lands between successive spaced bands, said additional quantities of the wear resistant material being staggered about the member.

RUSSEL W. LEWIS.
STANLEY C. MOORE.

References Cited in the file of this patent

UNITED STATES PATENTS

| Number | Name | Date |
|---|---|---|
| 2,247,173 | Huntsinger | June 24, 1941 |
| 2,288,124 | Creighton | June 30, 1942 |
| 2,334,350 | Neuhaus | Nov. 16, 1943 |